US011768218B2

(12) United States Patent
Bonanomi et al.

(10) Patent No.: US 11,768,218 B2
(45) Date of Patent: *Sep. 26, 2023

(54) GEL AND POLYMER BASED FLOW METERS

(71) Applicant: CALIFORNIA INSTITUTE OF TECHNOLOGY, Pasadena, CA (US)

(72) Inventors: Luca Bonanomi, Pasadena, CA (US); Vincenzo Costanza, Pasadena, CA (US); Chiara Daraio, Pasadena, CA (US); Giovanni Moscato, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/676,703

(22) Filed: Feb. 21, 2022

(65) Prior Publication Data

US 2022/0283198 A1 Sep. 8, 2022

Related U.S. Application Data

(63) Continuation of application No. 16/404,586, filed on May 6, 2019, now Pat. No. 11,255,870.

(60) Provisional application No. 62/667,742, filed on May 7, 2018.

(51) Int. Cl.
*G01P 5/10* (2006.01)
*G01F 1/688* (2006.01)
*G01P 5/12* (2006.01)

(52) U.S. Cl.
CPC ............... *G01P 5/10* (2013.01); *G01F 1/688* (2013.01); *G01P 5/12* (2013.01)

(58) Field of Classification Search
None
See application file for complete search history.

(56) References Cited

U.S. PATENT DOCUMENTS 4,283,944 A * 8/1981 Gruner .................... G01F 1/684
　　　　　　　　　　　　　　　　　　　　　73/204.26
8,069,718 B2 * 12/2011 Nakano ................... G01F 1/692
　　　　　　　　　　　　　　　　　　　　　73/204.26
8,895,076 B2 　 11/2014 Kataoka et al.
(Continued)

FOREIGN PATENT DOCUMENTS

CN 　　　104695227 A 　　6/2015
EP 　　　2676793 A1 　　12/2013
(Continued)

OTHER PUBLICATIONS

European Search Report and Written Opinion issued for EP Patent Application No. 15195729 filed on Nov. 20, 2015, on behalf of Eth Zürich, dated Jul. 27, 2016. Search Completed Jul. 20, 2016. 7 Pages.
(Continued)

*Primary Examiner* — Justin N Olamit
(74) *Attorney, Agent, or Firm* — Steinfl + Bruno LLP

(57) ABSTRACT

A sensor includes a heater, a thermal insulator between two thermometer layers, the heater generating a thermal gradient within the thermal insulator. The thermometers give an
(Continued)

indirect measurement of fluid flow around the sensor, based on their temperature readings. The thermometers are flexible layers including gels.

23 Claims, 5 Drawing Sheets

(56) References Cited

U.S. PATENT DOCUMENTS

| | | | |
|---|---|---|---|
| 10,090,466 | B2 | 10/2018 | Chan |
| 10,345,153 | B2 * | 7/2019 | Daraio ............... G01J 5/20 |
| 11,255,870 | B2 | 2/2022 | Bonanomi et al. |
| 2006/0030685 | A1 | 2/2006 | Passade et al. |
| 2007/0295907 | A1 | 12/2007 | Brott et al. |
| 2013/0324697 | A1 | 12/2013 | Stepanski et al. |
| 2014/0030538 | A1 | 1/2014 | Boutillier et al. |
| 2014/0267757 | A1 | 9/2014 | Abramson et al. |
| 2015/0203676 | A1 | 7/2015 | Li |
| 2015/0247070 | A1 | 9/2015 | Nam et al. |
| 2018/0016407 | A1 | 1/2018 | Landa |
| 2019/0339298 | A1 | 11/2019 | Bonanomi et al. |
| 2020/0203762 | A1 | 6/2020 | Park et al. |
| 2021/0024657 | A1 | 1/2021 | Choi et al. |
| 2022/0056188 | A1 | 2/2022 | Choi et al. |

FOREIGN PATENT DOCUMENTS

| | | |
|---|---|---|
| EP | 2944858 B1 | 11/2019 |
| JP | H02232290 A | 9/1990 |
| JP | H09230126 A | 9/1997 |
| KR | 20170110644 A | 10/2017 |
| WO | 2020/120916 A1 | 6/2020 |

OTHER PUBLICATIONS

Non-Final Office Action for U.S. Appl. No. 16/935,300, filed Jul. 22, 2020, on behalf of Samsung Electronics Co., Ltd. et al, dated Mar. 1, 2022. 13 Pages.

Notice of Allowance for U.S. Appl. No. 16/404,543, filed May 6, 2019, on behalf of California Institute of Technology, dated Dec. 2, 2022. 16 pages.

Notice of Allowance for U.S. Appl. No. 16/935,300, filed Jul. 22, 2020, on behalf of Samsung Electronics Co., Ltd. et al, dated Jul. 5, 2022. 9 pages.

Notice of Allowance for U.S. Appl. No. 16/935,300, filed Jul. 22, 2020 on behalf of Samsung Electronics Co., Ltd. et al, dated Nov. 10, 2021. 7 Pages.

Pennakalathil et al., "pH-Responsive Near-Infrared Emitting Conjugated Polymer Nanoparticles for Cellular Imaging and Controlled-Drug Delivery", Journal of Polymer Science, Part A: Polymer Chemistry, 53(9), pp. 114-122, 2015, DOI: 10.1002/oola.27458.

Wei et al., "Studies on the state of ion aggregation in thermoplastic IPN based on SBS and styrene-methacrylate ionomer", vol. 2, pp. 244-247 (1996).

EP Communication pursuant to Article 94(3) EPC for EP Application No. EP16715264.4 filed on behalf of California Institute of Technology, dated Mar. 1, 2022. 4 Pages.

Non-Final Office Action issued for U.S. Appl. No. 16/404,543, filed May 6, 2019 on behalf of California Institute of Technology, dated May 27, 2022. 26 Pages.

Restriction Reguirementissued for U.S. Appl. No. 16/404,543, filed May 6, 2019 on behalf of California Institute of Technology, dated Dec. 2, 2021. 9 Pages.

Third Chinese Office Action for Application No. 201680030032.3 filed Mar. 24, 2016 in the name of California Institute of Technology, dated Mar. 16, 2020. 7 Pages.

* cited by examiner

GEL AND POLYMER BASED FLOW METERS

CROSS REFERENCE TO RELATED APPLICATIONS

The present application is a continuation of U.S. patent application Ser. No. 16/404,586, filed on May 6, 2019, which claims priority to U.S. Provisional Patent Application No. 62/667,742, filed on May 7, 2018, the disclosure of which are incorporated herein by reference in their entirety.

TECHNICAL FIELD

The present disclosure relates to flow meters. More particularly, it relates to gel and polymer based flow meters.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

In a first aspect of the disclosure, a method is described, the method comprising: at least one heater layer; at least one first thermometer layer; at least one second thermometer layer; and at least one thermal insulator layer between the first thermometer layer and the second thermometer layer, wherein: the at least one first thermometer layer and the at least second thermometer layer are gel materials, the at least one first thermometer layer is thermally insulated from an environment surrounding the sensor, the at least one second thermometer layer is thermally accessible by the environment, and the at least one heater layer is configured to generate a constant heat flux through the at least one first thermometer layer, the at least one thermal insulator layer, and the at least one second thermometer layer, thus generating a thermal gradient within the at least one thermal insulator.

DETAILED DESCRIPTION

The present disclosure describes flow meters based on gel or polymers, for example for aerodynamics applications. Aerodynamics measurements and wind tunnel experiments are of great importance in engineering: experiments carried out in wind tunnels allow investigation of the complex phenomena developing due to fluid—bodies and fluid—fluid interactions, while also enabling validation of computational fluid dynamics (CFD) code. The main aim of a wind tunnel experiment is often to acquire the pressure and velocity distribution around scaled-down models of structures of interest. Using this data, it is then possible to compute the forces acting on the body subject of the experiment, e.g. the drag force acting on a car, or the lift force generated by a wing.

Measuring techniques typically employed for aerodynamics measurements focus on pressure distributions or fluid velocities. For example, one technique referred to as a pressure tap is based on a Pitot tube used to measure static and dynamic pressure at a single point. Pressure taps and pressure sensitive paints are based on pressure distributions, while laser Doppler velocimetry is based on fluid velocities. Several of these sensors are typically attached to surfaces of interest of models tested in wind tunnels. In post processing, pressure distributions can be approximately reconstructed from the punctual pressure measurements.

Figure 5:
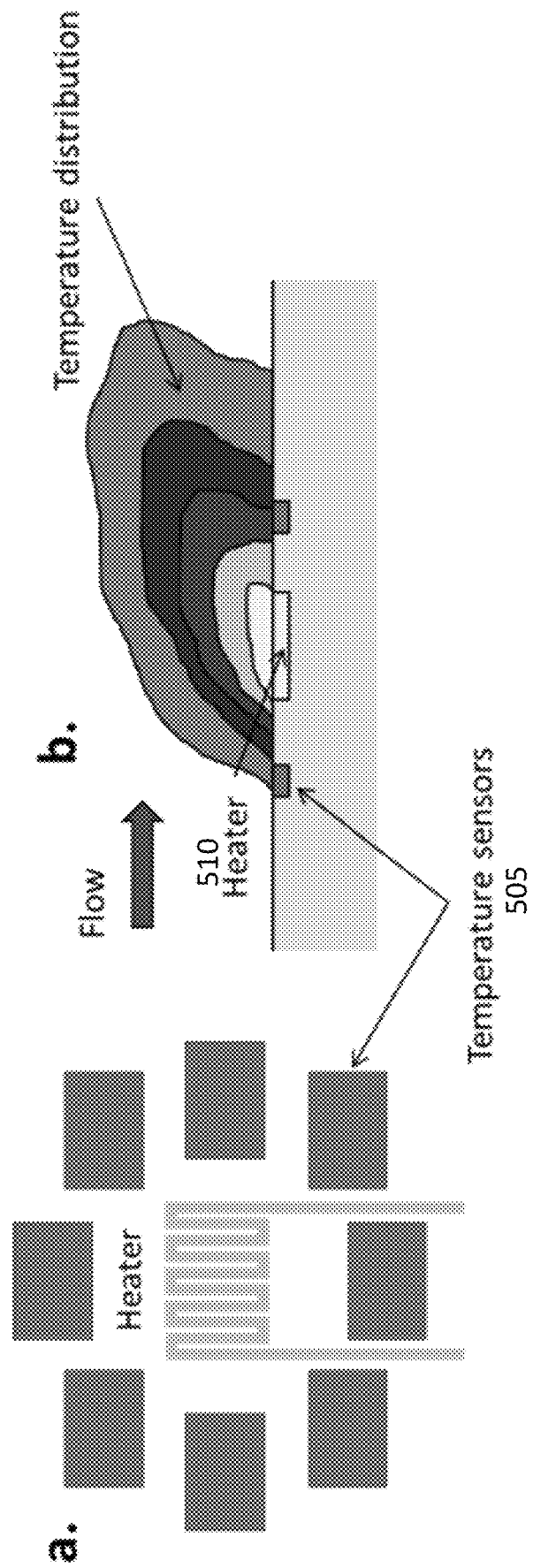
FIG. 5 illustrates a sensor.

Thermal flow meters can measure flow rate even at very low pressure, without affecting the flow. As illustrated in FIG. 5, the sensors combine one or more heating elements (510) and several temperature sensors (505) placed on the surface around the heater (FIG. 5 panel a). Heat is exchanged between the sensor and the fluid flowing at a temperature different from the heating element (FIG. 5, panel b). The flow rate is then determined by measuring the temperature distribution along the sensor created by the flowing fluid. In general, the temperature of the sensor cannot be raised arbitrarily, since high temperatures can be hazardous and can affect the flow. Therefore, the temperature gradient over the sensor is typically not particularly pronounced (the temperature variations are in the order of hundreds of milliKelvin). To achieve acceptable readings from these measurements, especially at low flow densities, commercially available devices are based on MEMS technology and on very accurate temperature sensors. Platinum is one of the most used thermistor, but it has a temperature sensitivity of about $0.4\Omega/°$ C. The maximum resistance variation of a thermistor in the considered temperature range for a thermal flow meter is of approximately milliOhms, which requires low-noise read-out electronics to be effectively measured. Furthermore, to optimize the temperature measurements, the thermistors are usually suspended. This requires a complicated fabrication process, which further raise the price for this type of sensors.

Pressure sensitive paints are a special class of paints which can react to pressure changes. These paints are generally composed of a porous polymeric matrix mixed with luminescent organic molecules. When using this technique, models are spray-coated with such paints before being placed in the wind tunnel. The model is illuminated by light of a specific wavelength, causing an electronic excitation in the luminescent molecule. The wavelength is based on the specific luminophore incorporated into the paint. The return to electronic ground state of the luminophore can be attained by either a radiative process, or a radiationless process. In the former case, the relaxation results in photonic emission, while in the latter, interaction with oxygen molecules results in the electron returning to its ground state without photonic emission, a process known as oxygen quenching of luminescence. A pressure sensitive paint is thus, in fact, an oxygen sensor. As the local oxygen (partial) pressure increases, so does the local oxygen concentration, resulting in stronger luminescence quenching. The net effect is a paint whose luminescence decreases as pressure increases. The re-emitted light is finally detected using a camera and, after calibration, the pressure distribution can be computed with virtually unlimited spatial resolution. Notable disadvantages of pressures sensitive paints are the rather long preparation time (deposition and curing time of the paints), and the relatively high velocity range at which they operate (Ma>0.3). Pressure sensitive paints are only suited for use in air flows, as their functioning mechanism relies on the oxygen contained in the gas flow.

Laser Doppler velocimetry is a measuring technique that exploits light scattering due to particles either naturally occurring, or induced, in the flow. Particles moving with the fluid are illuminated with a split laser beam. The shift in frequency between scattered and incident light is proportional to the velocity of the scattering particles, due to the Doppler effect.

The present disclosure describes sensors to perform measurements based on thermal effects, convection in particular. Convection is one of the three heat transfer mechanisms, being the one prevailing in fluids. The convective heat transfer law states that a surface immersed in a moving fluid experiences a heat flux proportional to the temperature difference existing between the surface itself and the fluid, i.e.:

$$\dot{q}''=\alpha \cdot (T-T_\infty)$$

where: $\dot{q}''$ is the convective heat flux per unit area leaving the surface in $Wm^{-2}$, $\alpha$ is the convective heat transfer coefficient in $WK^{-1} m^{-2}$, T is the temperature of the surface in K, and $T_\infty$, is the temperature of the fluid in K. The heat transfer coefficient $\alpha$ is generally very difficult to compute, as it is dependent on many parameters including fluid properties (such as density and specific heat) and problem-specific geometry. In any case, though, a strong dependence of a on the fluid velocity can be observed. In other words, the faster the fluid moves over the surface, the higher the heat transfer coefficient $\alpha$.

This principle is exploited by hot-wire anemometers, i.e. a class of instruments capable of measuring free-stream air velocity (or wind speed, hence the name) based on the aforementioned principle. A hot-wire anemometer is composed of a metallic wire heated significantly above ambient temperature by resistive Joule effect. A feedback loop keeps the wire at a constant temperature by controlling the current through the wire. As the fluid moves around the wire, some of the generated heat is subtracted by convection, thus prompting a response by the feedback loop and an increased current. Since the magnitude of this effect holds a strong dependence on fluid velocity, a calibration procedure allows obtaining the free-stream speed as function of the control effort, that is the electric current in the wire. Hot-wire anemometers are used in free stream conditions, and by construction they offer a very limited spatial resolution. Therefore, their use in wind tunnel experiments is limited to the determination of the free-flowing air speed. A conformal heat-flux sensor, improving on the principle of a hot-wire anemometer with higher spatial resolution and attached on model surfaces in wind tunnel is an advantageous alternative to measure quantities of interest during experiments. The present disclosure describes how to design these conformal heat-flux sensors.

Figure 1:
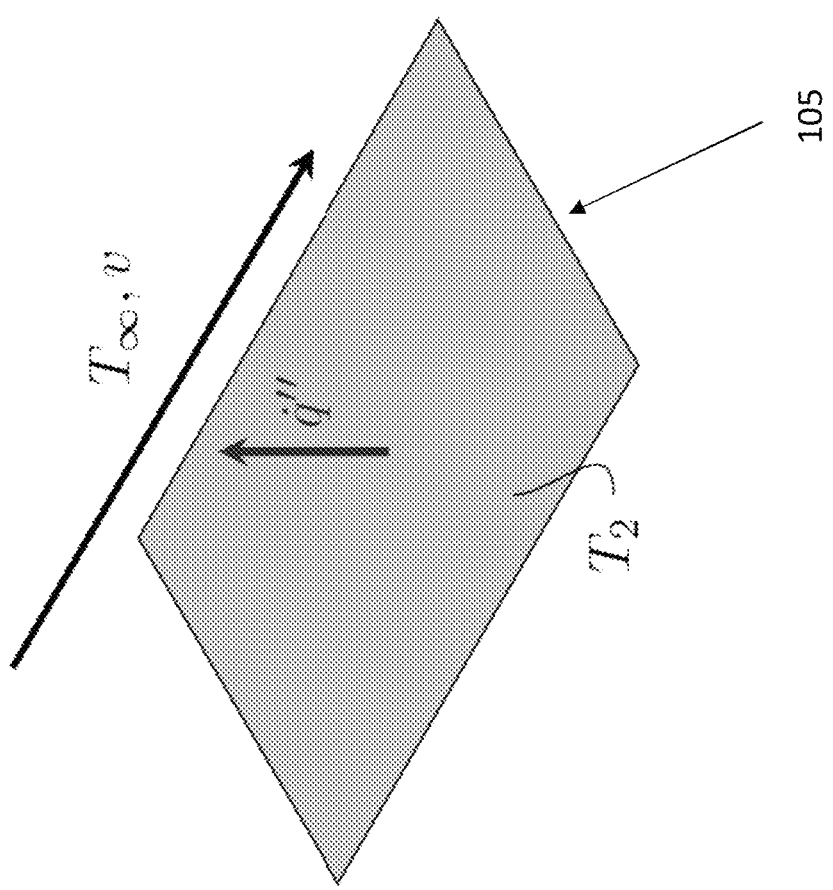
FIG. 1 illustrates convection for a surface.

With reference to FIG. 1, a surface (105) at a temperature $T_2$, immersed in a moving fluid, exchanges heat with the fluid at a rate depending on the fluid's temperature $T_\infty$, its velocity v, and a problem-specific coefficient $\alpha$, which is strongly dependent on the fluid's velocity v. In FIG. 1, the underlying physical phenomenon is described by the convection heat transfer law.

When the temperatures $T_\infty$, and $T_2$ are known, and the heat flux is known, it is possible to invert the convection law to obtain:

$$\alpha = \frac{\dot{q}''}{T_2 - T_\infty}$$

Figure 2:
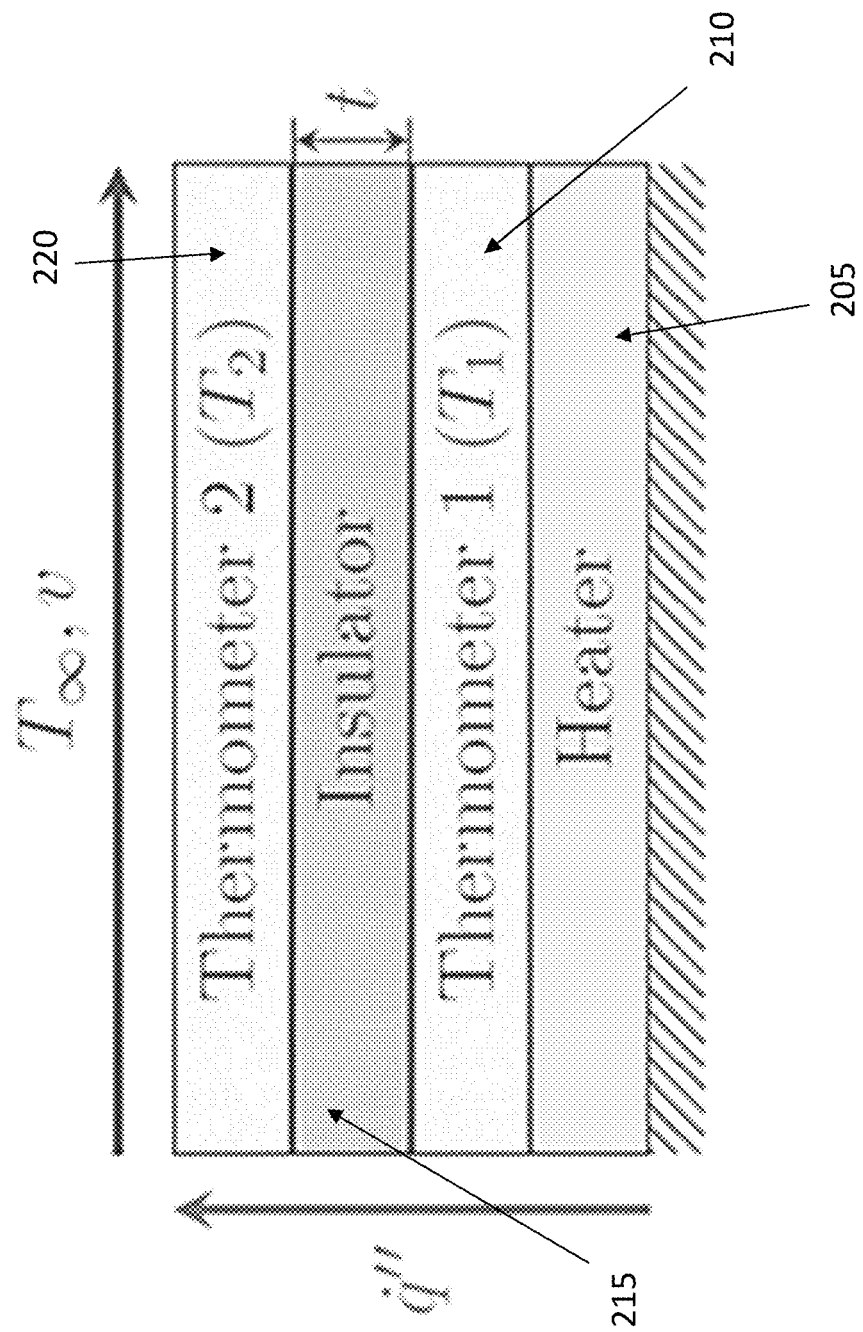
FIG. 2 illustrates an exemplary sensor.

Because of the strong dependence of a on the fluid's velocity, measuring a provides information on the fluid's velocity. The larger $\alpha$ is, the larger the flow speed. In some embodiments, as described in the present disclosure, a sensor can be fabricated based on the physics describing FIG. 1. A sensor, in some embodiments, comprises two thin thermometers separated by a thermal insulator. FIG. 2 illustrates an example of a sensor comprising a heater (205), a first thermometer (210), a thermal insulator (215), and a second thermometer (220).

The thermometers comprise a temperature sensitive material, such as a gel or a polymer. One surface of the sensor is insulated, whereas the opposite surface is exposed to the moving fluid, and is thus able to exchange heat therewith. A heater imposes a constant heat flux through the device, building a temperature gradient within the insulator. The temperature gradient is measured using the first and second thermometers, thus allowing the computation of the convective heat-transfer coefficient $\alpha$. The larger the temperature difference between the temperatures of the first and second thermometers, $T_1$ and $T_2$, the larger $\alpha$, and thus the larger the flow speed. The convective coefficient $\alpha$ can be calculated as:

$$\alpha = -\frac{k(T_2 - T_1)}{t(T_2 - T_\infty)}$$

where: k is the thermal conductivity of the insulator; $T_1$, $T_2$ are, respectively, the temperatures of the two thermometers on either side of the insulator; $T_\infty$ is the temperature of the fluid, and t is the thickness of the insulating layer. In some embodiments, a different arrangement or number of layers may be used, based on at least an insulating layer between two thermometers, and a heater. In some embodiments, the sensors can comprise several thermometer layers, and several heating or cooling layers. The sensors can comprise thin electrical heaters, resistive heaters, polyimide foil heaters, an electrical circuit heating by Joule effect, or a Peltier element. The sensor may also comprise a heater or cooling layer that incorporates a microfluidic circuit or channel. One of the thermometer layers is thermally accessible by the environment.

Figure 3:
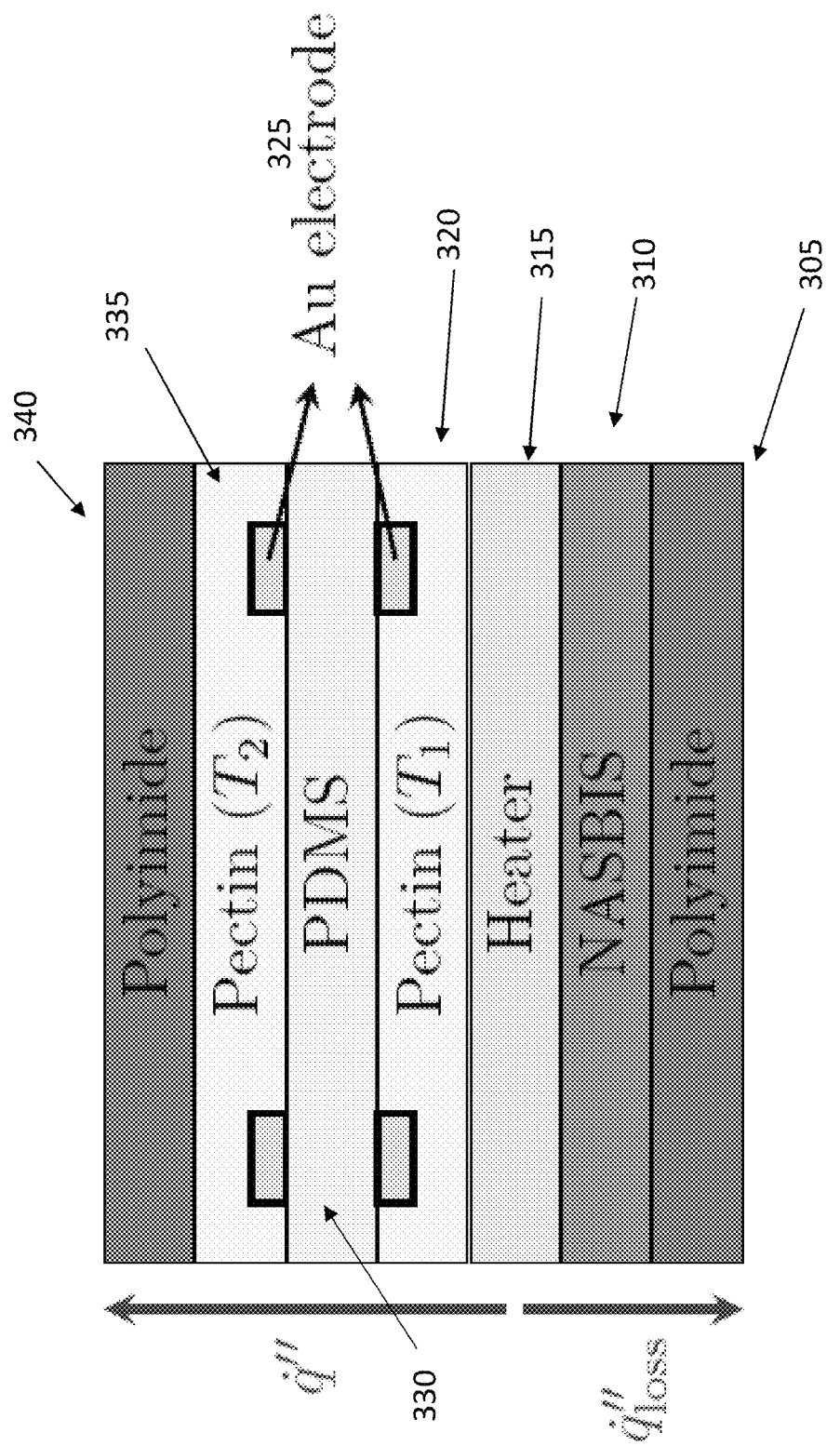
FIG. 3 illustrates an exemplary cross section of a device based on pectin cross-linked by calcium ions as a temperature sensitive layer.

FIG. 3 illustrates an exemplary cross section of a device based on pectin cross-linked by calcium ions as a temperature sensitive layer (a thermometer). In the embodiment of FIG. 3, the sensor comprises a polyimide layer (305), a thermal insulator layer (310), a heater (315), a thermometer based on pectin (320), a thermal insulator (330), a thermometer based on pectin (335), and a polyimide layer (340). In this embodiment, pectin is used for temperature sensing, however other materials may be used instead. In this example, the insulator (310) comprises NASBIS® (NAno Silica Ball InSulator), a flexible, thermally insulating material. In this embodiment, the insulator (330) comprises a polydimethylsiloxane (PDMS). Gold electrodes (325) can be used for the two pectin thermometers.

Figure 4:
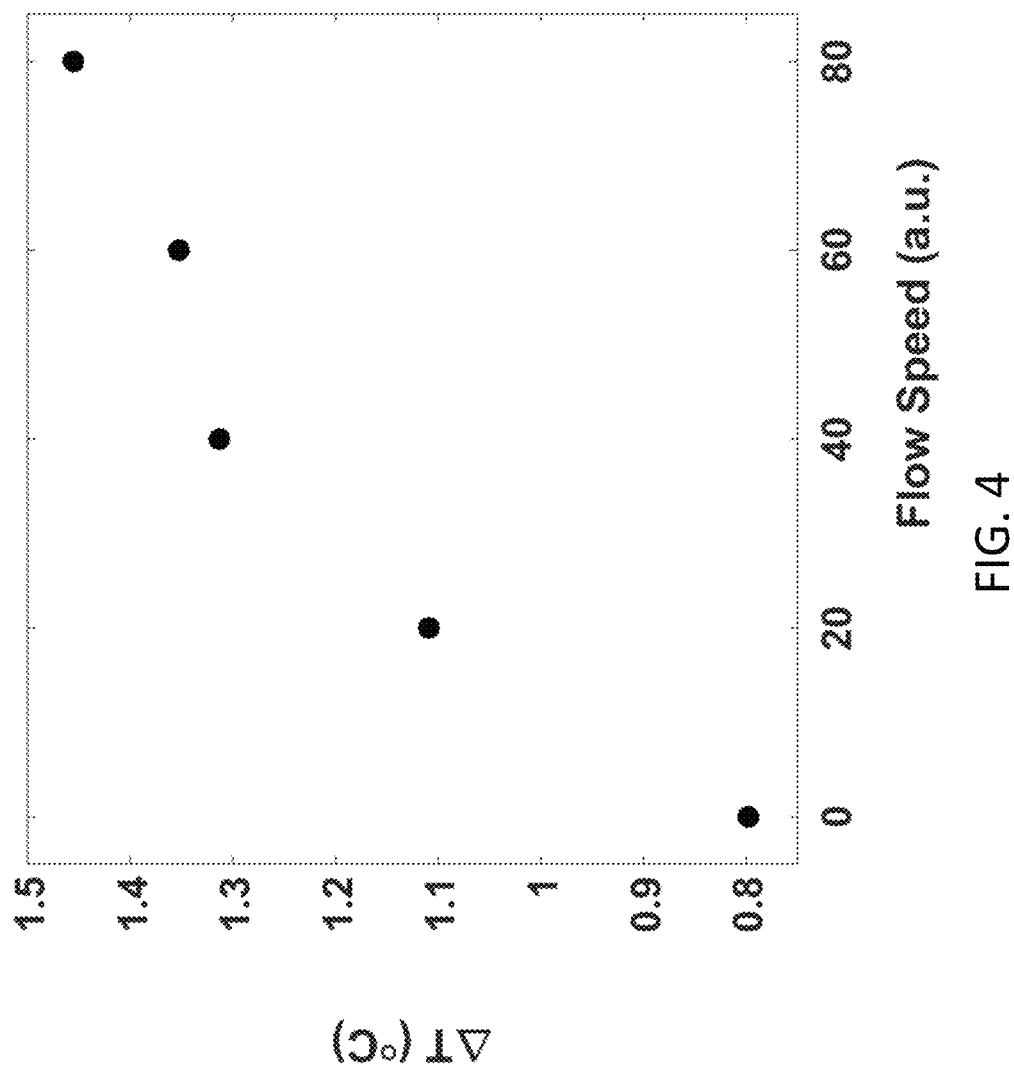
FIG. 4 illustrates exemplary data for the temperature difference between the two thermometers in a sensor.

FIG. 4 illustrates exemplary data for the temperature difference between the two thermometers, which are at temperatures $T_1$ and $T_2$, as a function of the flow speed. A larger difference between $T_1$ and $T_2$ corresponds to a larger flow speed. The device can be calibrated to provide the actual flow speed calculated from the temperature difference. The sensor can be designed as an array of similar pixels to provide a spatial map of the flow's speed. Several sensors can be applied on a model surface to measure the flow speed at different location, thus realizing a conformal sensor array. The sensor can be fabricated from flexible materials, and can therefore be conformally attached to curved surfaces.

As described above, the present disclosure combines a thin heater with a class of organic, temperature-sensitive materials, which show a high resistance versus temperature response. The thin heater serves as a heat source, while the temperature sensitive material, deposited as a thin film or as an array of sensors, provides the temperature feedback. In some embodiments, the sensors of the present disclosure are based on organic bio-molecules, such as pectin, alginate, chitosan or a combination of these. Pectin-based thin films as described above are very responsive to temperature. Pectin is made of structurally and functionally very complex, acid-rich polysaccharides. In low-ester pectin, ionic bridges are formed, at near neutral pH, between $Ca^{2+}$ ions and the ionized carboxyl groups of the galacturonic acid present in the molecule, forming an "egg box" structure in which cations are stored. Because the cross-linking between pectin molecules decreases exponentially with temperature, increasing the temperature of a $Ca^{2+}$-cross-linked pectin results in a dramatic increase of ionic conduction. $Ca^{2+}$-cross-linked pectin can be deposited on flexible substrate. The resulting ultrathin membranes (20-200 μm thin) show a variation in their resistance of two order of magnitudes over 45° C. As a comparison, a standard platinum thermistor (Pt100), varies its resistance by only about 1.5 times over the same interval. Besides possessing an extreme temperature responsivity, these pectin films have a very high signal-to-noise ratio and can sense temperature variation of at least 10 mK. Pectin layers can also be produced on extended areas, and can monitor 2D temperature distributions thanks to their extraordinary responsivity and sensitivity. These advantages allow collecting flow information on extended areas, instead of the localized data provided by standard flow meters.

In some embodiments, the pectin films can be crosslinked by Ca, Cu, or Mg. Instead of pectin, other materials may be used, for example alginate crosslinked by Ca, Cu, or Mg. In some embodiments, the sensors can be based on specific materials. The present disclosure describes some exemplary materials in the following. These materials can also be used for purposes other than flow sensors. Therefore, the materials in the following are described both for use in flow sensors, and for use unrelated to flow sensors. The present disclosure therefore describes, in some embodiments, a flow meter comprising one or more hydrogel-based temperature sensors, and one or more heating (or cooling) elements. For example, a sensor can comprise, as described above, a resistive heater coupled with two local pectin-based temperature sensors.

As known to the person of ordinary skill in the art, pectin, a component of all higher plant cell walls, is made of structurally and functionally very complex, acid-rich polysaccharides. Pectin plays several roles in plants— for example, it is an essential structural component of cell walls and binds ions and enzymes. In high-ester pectins, at acidic pH, individual pectin chains are linked together by hydrogen bonds and hydrophobic interactions. In contrast, in low-ester pectins, ionic bridges are formed, at near neutral pH, between $Ca^{2+}$ ions and the ionized carboxyl groups of the galacturonic acid, forming an "egg box" in which cations are stored. Since the crosslinking between pectin molecules decreases exponentially with temperature, increasing the temperature of a $Ca^{2+}$-crosslinked pectin increases ionic conduction.

Currently, the potential applications of pectin gels as temperature-sensing elements in mobile phones and automotive applications are challenged by several factors. First, the temperature responsivity and conductivity of hydrogel-based pectin are both highly dependent on the water content of the membrane, whereas the water content is subjected to fluctuations in ambient humidity and temperature. Secondly, being a water-based gel, the applicable temperature range of a pectin gel is limited. The increased evaporation of water at higher temperatures also renders the membrane unstable at higher temperature ranges (>70° C.). Further, due to the intrinsic rigidity of pectin's molecular structure, the flexibility of pectin membranes is dependent on their water content. Excessively reducing the pectin water content results in shrinkage of the pectin membranes, detachment of the membrane from electrodes, and increased brittleness of the membrane.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A device comprising:
   at least one heater layer;
   at least one first thermometer layer in contact with the at least one heater layer;
   at least one second thermometer layer; and
   at least one thermal insulator layer between the at least one first thermometer layer and the at least one second thermometer layer,
   wherein:
   the at least one first thermometer layer and the at least one second thermometer layer comprise temperature sensitive materials, the at least one first thermometer layer is thermally insulated from an environment surrounding the device, a top surface of at least one second thermometer layer is configured to measure a temperature of the environment, and the at least one heater layer is configured to generate a constant heat flux through the at least one first thermometer layer, the at least one thermal insulator layer, and the at least one second thermometer layer, thus generating a thermal gradient within the at least one thermal insulator; and wherein the device is configured to measure a temperature gradient using the at least one first thermometer layer and the at least one second thermometer layer allowing for a computation of a heat-transfer coefficient.

2. The device of claim 1, wherein the at least one heater layer is selected from the group consisting of: an electrical heater, a resistive heater, a polyimide foil heater, an electrical circuit heating by Joule effect, and a Peltier element.

3. The device of claim 1, wherein the at least one first thermometer layer and the at least one second thermometer layer comprise one or more of pectin, alginate, and chitosan.

4. The device of claim 1, wherein the at least one first thermometer layer or the at least one second thermometer layer comprise pectin crosslinked with ions.

5. The device of claim 4, wherein the ions comprise one or more of calcium ions, copper ions, and magnesium ions.

6. The device of claim 1, wherein the at least one thermal insulator is made of polydimethylsiloxane.

7. The device of claim 1, wherein the at least one heater layer, the at least one first thermometer layer, the at least one second thermometer layer, and the at least one thermal insulator are flexible layers.

8. The device of claim 1, wherein the temperature sensitive material is a gel.

9. The device of claim 1, wherein the temperature sensitive material is a polymer.

10. The device of claim 1, further comprising electrodes in each of the at least one first thermometer layer and the at least one second thermometer layer.

11. The device of claim 10, wherein the electrodes comprise gold.

12. The device of claim 1, wherein the first thermometer layer and the second thermometer layer are each between 20 to 200 μm thick.

13. A method for measuring a flow rate of a fluid using the device from claim 1; the method comprising:
generating a constant heat flux through the at least one first thermometer layer, the at least one insulating layer, and the at least one second thermometer layer from the at least one heater layer, thus generating a thermal gradient within the at least one insulating layer;
measuring a first temperature of the heat source by the at least one first thermometer layer coupled to the at least one heater layer;
measuring second temperature of the fluid by the at least one second thermometer layer, the at least one second thermometer layer being separated by the at least one first thermometer layer by the at least one insulating layer; and computing of a heat-transfer coefficient by calculating the flow rate from the first temperature and the second temperature.

14. The method of claim 13, wherein the calculating further includes a known heat flux value.

15. The method of claim 13, wherein the calculating further includes a thermal conductivity value of the at least one insulating layer.

16. The method of claim 13, wherein at least one of the at least one first thermometer layer and the at least one second thermometer layer comprise pectin or alginate.

17. The method of claim 16, wherein the pectin or alginate is cross-linked by ions.

18. The method of claim 17, wherein the ions comprise one or more of calcium ions, copper ions, and magnesium ions.

19. The method of claim 13, wherein at least one of the at least one first thermometer layer and the at least one second thermometer layer comprise chitosan.

20. The method of claim 13, wherein the generating heat comprises running current through the at least one heater layer, the heater layer being a resistive heater.

21. The method of claim 13, wherein the convective coefficient is determined by the formula $\alpha=-k(T_2-T_1)/t(T_2-T_\infty)$ where $\alpha$ is the convective coefficient, $T_1$ is the first temperature, $T_2$ is the second temperature, $T_\infty$ is a temperature of the fluid, k is a thermal conductivity of the insulating layer, and t is a thickness of the insulating layer.

22. The device of claim 1, wherein the first thermometer layer is between the second thermometer layer and the heater layer.

23. A device comprising:
at least one heater layer;
at least one first thermometer layer;
at least one second thermometer layer; and
at least one thermal insulator layer between the at least one first thermometer layer and the at least one second thermometer layer,
wherein:
the first thermometer layer is between the second thermometer layer and the heater layer;
the at least one first thermometer layer and the at least one second thermometer layer comprise temperature sensitive materials,
the at least one first thermometer layer is thermally insulated from an environment surrounding the device,
a top surface of at least one second thermometer layer is configured to measure a temperature of the environment, and
the at least one heater layer is configured to generate a constant heat flux through the at least one first thermometer layer, the at least one thermal insulator layer, and the at least one second thermometer layer, thus generating a thermal gradient within the at least one thermal insulator; and
wherein the device is configured to measure a temperature gradient using the at least one first thermometer layer and the at least one second thermometer layer allowing for a computation of a heat-transfer coefficient.

* * * * *